(12) United States Patent
Kitano et al.

(10) Patent No.: US 10,744,744 B2
(45) Date of Patent: Aug. 18, 2020

(54) INTERMEDIATE FILM FOR LAMINATED GLASS AND LAMINATED GLASS

(71) Applicant: SEKISUI CHEMICAL CO., LTD., Osaka (JP)

(72) Inventors: Hirofumi Kitano, Shiga (JP); Taiki Katayama, Shiga (JP)

(73) Assignee: SEKISUI CHEMICAL CO., LTD., Osaka (JP)

( * ) Notice: Subject to any disclaimer, the term of this patent is extended or adjusted under 35 U.S.C. 154(b) by 0 days.

(21) Appl. No.: 14/414,747

(22) PCT Filed: Aug. 2, 2013

(86) PCT No.: PCT/JP2013/071046
§ 371 (c)(1),
(2) Date: Jan. 14, 2015

(87) PCT Pub. No.: WO2014/021459
PCT Pub. Date: Feb. 6, 2014

(65) Prior Publication Data
US 2015/0174862 A1 Jun. 25, 2015

(30) Foreign Application Priority Data

Aug. 2, 2012 (JP) .................................. 2012-172165

(51) Int. Cl.
*B32B 17/10* (2006.01)
*C08K 5/00* (2006.01)
(Continued)

(52) U.S. Cl.
CPC .......... *B32B 17/10559* (2013.01); *B32B 3/28* (2013.01); *B32B 17/10036* (2013.01);
(Continued)

(58) Field of Classification Search
CPC ................ B32B 17/10559; B32B 3/28; B32B 17/10036; B32B 17/10587;
(Continued)

(56) References Cited

U.S. PATENT DOCUMENTS 4,968,745 A * 11/1990 Misra .................. C08F 8/28
525/61
5,455,103 A * 10/1995 Hoagland ......... B32B 17/10577
156/102
(Continued)

FOREIGN PATENT DOCUMENTS

| CA | 2 388 107 | 5/2001 |
| CN | 202272827 | 6/2012 |

(Continued)

OTHER PUBLICATIONS

JP 2004-143008 Matsudo, May 2004, translation provided by applicant.*

(Continued)

*Primary Examiner* — Frank J Vineis
*Assistant Examiner* — Laura B Figg
(74) *Attorney, Agent, or Firm* — Wenderoth, Lind & Ponack, L.L.P.

(57) ABSTRACT

The present invention aims to provide an interlayer film for a laminated glass which includes two or more resin layers laminated together and which has excellent deaeration properties in the manufacturing process of a laminated glass and prevents ghosting. The present invention also aims to provide a laminated glass comprising the interlayer film for a laminated glass. The present invention relates to an interlayer film for a laminated glass which includes two or more resin layers laminated together and has many minute recesses and many minute protrusions on at least one surface thereof. The recesses have a groove shape with a continuous (Continued)

bottom. The recesses are formed in a regular manner, and recesses adjacent to each other being parallel. Recesses adjacent to each other are spaced less than 750 μm.

7 Claims, 1 Drawing Sheet

(51) Int. Cl.
  *B32B 3/28* (2006.01)
  *B32B 27/08* (2006.01)
(52) U.S. Cl.
  CPC .. *B32B 17/10587* (2013.01); *B32B 17/10761* (2013.01); *B32B 27/08* (2013.01); *C08K 5/0016* (2013.01); *B32B 2419/00* (2013.01); *B32B 2605/08* (2013.01); *B32B 2605/18* (2013.01); *Y10T 428/24711* (2015.01); *Y10T 428/24727* (2015.01)
(58) Field of Classification Search
  CPC ............... B32B 17/10761; B32B 27/08; Y10T 428/24711; Y10T 428/24727; C03C 27/10; C08K 5/0016; C08K 5/103; C08L 29/14
  USPC .......................................................... 428/186
  See application file for complete search history.

(56) References Cited

U.S. PATENT DOCUMENTS

| | | | |
|---|---|---|---|
| 6,093,471 A | | 7/2000 | Hopfe et al. |
| 2006/0210782 A1* | | 9/2006 | Lu .................... B32B 17/10036 428/212 |
| 2007/0042160 A1 | | 2/2007 | Nakajima et al. |
| 2008/0268204 A1 | | 10/2008 | Bourcier et al. |
| 2008/0286530 A1 | | 11/2008 | Smith |

FOREIGN PATENT DOCUMENTS

| | | | | |
|---|---|---|---|---|
| EP | 1 233 007 | | 8/2002 | |
| JP | 62-52148 | | 3/1987 | |
| JP | 10-45438 | | 2/1998 | |
| JP | 11-35348 | | 2/1999 | |
| JP | 2000-7390 | | 1/2000 | |
| JP | 2000-319045 | | 11/2000 | |
| JP | 2001-150540 | | 6/2001 | |
| JP | 2003-48762 | | 2/2003 | |
| JP | 2003-128442 | | 5/2003 | |
| JP | 2004-143008 | | 5/2004 | |
| JP | 2004143008 A | * | 5/2004 | ............. B32B 27/00 |
| JP | 2007-331959 | | 12/2007 | |
| JP | 2010-524843 | | 7/2010 | |
| JP | 2011-42552 | | 3/2011 | |
| JP | 2011-88783 | | 5/2011 | |
| JP | 4975892 | | 7/2012 | |
| RU | 2 264 360 | | 1/2004 | |
| TW | 524784 | | 3/2003 | |
| WO | 2008/134594 | | 11/2008 | |

OTHER PUBLICATIONS

JP 2004-143008 Matsudo, May 2004, translation provided by applicant (Year: 2004).*
English translation of International Preliminary Report on Patentability dated Mar. 12, 2014 in International Application No. PCT/JP013/071046.
International Search Report dated Aug. 27, 2013 in International (PCT) Application No. PCT/JP2013/071046.
Extended European Search Report dated Feb. 12, 2016 in corresponding European Application No. 13825162.4.
Office Action dated Jan. 4, 2017 in corresponding European Application No. 13 825 162.4.

* cited by examiner

INTERMEDIATE FILM FOR LAMINATED GLASS AND LAMINATED GLASS

TECHNICAL FIELD

The present invention relates to an interlayer film for a laminated glass including two or more resin layers laminated together. The interlayer film exhibits excellent deaeration properties in the manufacturing process of a laminated glass and prevents ghosting. The present invention also relates to a laminated glass that comprises the interlayer film for a laminated glass.

BACKGROUND ART

A laminated glass made up of two glass plates with an interlayer film of plasticized polyvinyl butyral therebetween, all bonded together, has been widely used as window glass of automobiles, aircraft, architectures, and the like.

Interlayer films for a laminated glass may include a single resin layer, or may include a laminate of two or more resin layers. If an interlayer film includes, as the two or more resin layers, a first resin layer and a second resin layer which have different characteristics, the interlayer film can provide various properties that are difficult to achieve with interlayer films of a single layer.

For example, Patent Literature 1 discloses an interlayer film for a laminated glass including a sound insulating layer and two protective layers sandwiching the sound insulating layer. The sound insulating layer of the interlayer film for a laminated glass of Patent Literature 1 contains a polyvinyl acetal resin highly compatible with plasticizer and a large amount of plasticizer, thus providing excellent sound insulating properties. The protective layers, which sandwich the sound insulating layer, prevent the large amount of plasticizer in the sound insulating layer from bleeding out, thus preventing reduction of adhesion between the interlayer film and glass.

However, a laminated glass with such an interlayer film including a laminate of two or more resin layers may unfortunately cause ghost images when external rays of light are viewed through the glass. Such ghosting is pronounced especially in interlayer films for a laminated glass having excellent sound insulating properties, such as that of Patent Literature 1.

CITATION LIST

Patent Literature

Patent Literature 1: JP 2007-331959 A

SUMMARY OF INVENTION

Technical Problem

The present inventors studied to identify the reason that an interlayer film for a laminated glass including two or more resin layers laminated together causes ghosting. As a result, they have found out that ghosting is caused by recesses and protrusions formed on the surface of the interlayer film for a laminated glass.

In typical manufacturing of a laminated glass, a laminate of at least two glass plates with an interlayer film for a laminated glass therebetween is pressed between nip rolls (squeeze deaeration) or put in a rubber bag and subjected to vacuum suction (vacuum deaeration), so that the laminate is preliminarily pressure-bonded while the air remaining between the glass plates and the interlayer film can be removed. The laminate is subsequently fully pressure-bonded by, for example, heating and pressurizing in an autoclave. This produces a laminated glass. Deaeration properties in laminating glass and an interlayer film for a laminated glass are important in the manufacturing process of a laminated glass. The interlayer film for a laminated glass has minute recesses and protrusions formed on at least one surface thereof to achieve sufficient deaeration properties in manufacturing a laminated glass.

Such recesses and protrusions formed on the surface of an interlayer film for a laminated glass are generally crushed during preliminary pressure bonding or full pressure bonding in the manufacturing process of a laminated glass. They therefore have been scarcely an issue for the finished laminated glass.

However, the present inventors have found out that in the case of an interlayer film for a laminated glass including two or more resin layers laminated together, the recesses and protrusions affect the laminated glass obtained through a laminated glass manufacturing process, causing ghosting.

That is, in the case of forming recesses and protrusions on a surface of such an interlayer film, not only are recesses and protrusions formed on the surface of the interlayer film, but also the recesses and protrusions are transferred to the interface between the resin layers due to the pressure applied during the processing, thus making the interface uneven. Although the recesses and protrusions on the surface of the interlayer film are crushed during preliminary pressure bonding and full pressure bonding in the laminated glass manufacturing process, this uneven interface presumably causes ghosting. Interlayer films for a laminated glass having excellent sound insulating properties such as that of Patent Literature 1, which are likely to allow the transfer of the recesses and protrusions to the interface between the protective layers and the sound insulating layer, seem especially prone to cause ghosting.

An interlayer film for a laminated glass having no recesses or protrusions will not cause ghosting. However, such a film with no recesses or protrusions results in insufficient deaeration in manufacturing a laminated glass. This causes air bubbles between the glass and the interlayer film, which impairs the appearance of the laminated glass.

In view of the situation in the art, an object of the present invention is to provide an interlayer film for a laminated glass which includes two or more resin layers laminated together and which exhibits excellent deaeration properties in manufacturing laminated glass and prevents ghosting. Another object of the present invention is to provide a laminated glass including the interlayer film for a laminated glass.

Solution to Problem

The present invention relates to an interlayer film for a laminated glass including two or more resin layers laminated together. The interlayer film has many minute recesses and many minute protrusions on at least one surface thereof. The recesses each have a groove shape with a continuous bottom. The recesses being formed in a regular manner, and recesses adjacent to each other being parallel. Recesses adjacent to each other being spaced less than 750 μm apart.

The present invention is described in detail below.

As a result of keen examination, the present inventors have found that the contriving of the pattern of the recesses and protrusions on a surface of an interlayer film for a laminated glass enables an interlayer film to have excellent deaeration properties in manufacturing a laminated glass and while preventing ghosting, even if the film includes two or more resin layers laminated together. Such a finding has led to the completion of the present invention.

The interlayer film for a laminated glass of the present invention has many minute recesses and many minute protrusions on at least one surface thereof.

The recesses in the interlayer film for a laminated glass of the present invention have a groove shape with a continuous bottom. The recesses are formed in a regular manner, and recesses adjacent to each other are parallel. In preliminary pressure bonding and full pressure bonding of a laminate of two glass plates with an interlayer film for a laminated glass therebetween, the ease of air removal is generally closely related with the continuity and the smoothness of the bottom of the recesses. When the recesses on the at least one surface of the interlayer film have a groove shape with a continuous bottom and are formed parallel to one another in a regular manner, the bottom of the recesses has better continuity. This significantly improves deaeration properties in preliminary pressure bonding and full pressure bonding.

The phrase "formed in a regular manner" herein means that the recesses are formed parallel and may be formed at equal or unequal intervals.

FIGS. 1 and 2 are schematic views each illustrating an example of an interlayer film for a laminated glass in which recesses each having a groove shape with a continuous bottom are formed at equal intervals, and recesses adjacent to each other are parallel.

In the interlayer film for a laminated glass of the present invention, the interval (hereinafter, also referred to as "recess interval") between a recess that has a groove shape with a continuous bottom and an adjacent one is less than 750 µm. If the recess interval is less than 750 µm, ghosting in the obtained laminated glass can be prevented without sacrificing deaeration properties during preliminary pressure bonding and full pressure bonding. This is presumably because the recess interval less than 750 µm enables prevention of transfer of the recesses and protrusions to the interface of the resin layers forming the interlayer film for a laminated glass. The upper limit of the recess interval is preferably 600 µm, more preferably 500 µm, still more preferably 400 µm, and particularly preferably 200 µm.

Especially for further prevention of ghosting, the upper limit of the recess interval is preferably 400 µm, more preferably 300 µm, and still more preferably 200 µm. The higher the intensity of light incident from outside the laminated glass, the more likely ghosting occurs. However, if the recess interval is 400 µm or less, the interlayer film can reliably prevent ghosting if light with a very high intensity is incident on the laminated glass.

The lower limit of the recess interval is not particularly limited. From the viewpoint of workability in manufacturing a laminated glass, the lower limit thereof in practice is preferably 10 µm, more preferably 50 µm, and still more preferably 100 µm.

The recess interval herein means the shortest distance between the bottommost portions of two adjacent recesses that have a groove shape with a continuous bottom. Specifically, the recess interval may be determined as follows. A surface (viewing range: 20 mm×20 mm) of the interlayer film for a laminated glass is observed with a light microscope (e.g., "BS-8000III" available from SONIC-GROUP), and the shortest distance between the bottommost portions of each observed pair of recesses adjacent to each other is measured. This is followed by calculating the average of the measured shortest distances, whereby the recess interval is determined. Alternatively, the recess interval may be defined as the maximum of the measured shortest distances. Thus, the recess interval herein may be defined as the average of the shortest distances or may be defined as the maximum of the shortest distances. Preferably it is defined as the average of the shortest distances.

The lower limit of the groove depth (Rzg) of the recesses is preferably 10 µm, and the upper limit thereof is preferably 40 µm. If the recesses have a groove depth (Rzg) of 10 µm or greater, deaeration properties during preliminary pressure bonding and full pressure bonding is further improved. If the recesses have a groove depth of 40 µm or smaller, temperature during preliminary pressure bonding and full pressure bonding can be lower. The lower limit of the groove depth (Rzg) of the recesses is more preferably 15 µm, and the upper limit thereof is more preferably 35 µm. The lower limit thereof is still more preferably 18 µm, and the upper limit thereof is still more preferably 30 µm. The lower limit thereof is particularly preferably 20 µm, and the upper limit thereof is particularly preferably 28 µm.

The groove depth (Rzg) of the recesses herein means the average value of the groove depth determined using the groove depth of observed recesses and the number of the observed recesses. The groove depths of the observed recesses are each calculated based on the average line (a line that is set such that the sum of the squares of the deviations from that line to the roughness curve be minimized) of a roughness curve specified in JIS B-0601 (1994) "Surface roughness—Definitions and designation." The groove depth (Rzg) of the recesses can easily be determined by processing digital signals obtained using a surface roughness tester ("SE1700α" available from Kosaka Laboratory Ltd.).

The recesses and protrusions may have the shape of those commonly formed on a surface of an interlayer film for a laminated glass. The recesses and protrusions may have a shape of, for example, an engraved line, a grid, or a hemisphere. The recesses and protrusions may be in the form of embossments. The recesses and protrusions preferably have a shape of an engraved line.

The protrusions may have a flat top as illustrated in FIG. 1. Alternatively, the protrusions may have a non-flat top as shown in FIG. 2. For the protrusions with a flat top, minute recesses and protrusions may further be formed on the planar top.

The heights of the protrusions may be the same as or different from one another. The depths of the recesses, which correspond to the heights of protrusions, may also be the same as or different from one another as long as the bottom of the recesses is continuous.

In the present invention, the many minutes recesses and many minute protrusions on the at least one surface of the interlayer film for a laminated glass may be formed by, for example, an embossing roll method, a calender roll method, or a profile extrusion. Among these, an embossing roll method, which can form recesses in a regular manner or at equal intervals such that recesses adjacent to each other can be parallel, is preferable. For a significant improvement in deaeration properties during preliminary pressure bonding and full pressure bonding, the interlayer film for a laminated glass preferably has many minute recesses and many minute protrusions on both surfaces thereof.

Examples of the embossing roll to be used in the embossing roll method include: one having minute embossed pattern (textured pattern) on its roll surface formed by blasting the surface of a metal roll with abrasive (e.g., aluminum oxide, silicon oxide) and then lapping the surface by vertical polishing to reduce the number of oversized peaks on the surface; one having minute embossed pattern (textured pattern) on its roll surface formed by transferring an embossed pattern (textured pattern) of an engraving mill (mother mill) to the surface of a metal roll; and one having a minute etched embossed pattern (textured pattern) on its roll surface.

The interlayer film for a laminated glass of the present invention includes two or more resin layers laminated together. For example, if the interlayer film for a laminated glass includes, as the two or more resin layers, a first resin layer and a second resin layer which have different characteristics, the interlayer film can give properties that are difficult to achieve with interlayer films of a single resin layer. Yet, an interlayer film including such two or more resin layers laminated together has a problem of ghosting.

Preferably, the resin layers each contain a thermoplastic resin.

Examples of the thermoplastic resin include polyvinylidene fluoride, polytetrafluoroethylene, vinylidene fluoride-propylene hexafluoride copolymer, polytrifluoroethylene, acrylonitrile-butadiene-styrene copolymer, polyesters, polyethers, polyamides, polycarbonate, polyacrylate, polymethacrylate, polyvinyl chloride, polyethylene, polypropylene, polystyrene, polyvinyl acetal, and ethylene-vinyl acetate copolymer. The resin layers preferably contain polyvinyl acetal or an ethylene-vinyl acetate copolymer, and more preferably contain polyvinyl acetal.

Preferably, the resin layers each contain polyvinyl acetal and a plasticizer.

The plasticizer may be any plasticizer commonly used in interlayer films for a laminated glass. Examples thereof include organic plasticizers such as monobasic organic esters and polybasic organic esters and phosphoric acid plasticizers such as organophosphate compounds and organophosphite compounds.

Examples of the organic plasticizer include triethyleneglycol-di-2-ethylhexanoate, triethyleneglycol-di-2-ethylbutyrate, triethyleneglycol-di-n-heptanoate, tetraethyleneglycol-di-2-ethylhexanoate, tetraethyleneglycol-di-2-ethylbutyrate, tetraethyleneglycol-di-n-heptanoate, diethyleneglycol-di-2-ethylhexanoate, diethyleneglycol-di-2-ethylbutyrate, and diethyleneglycol-di-n-heptanoate. The resin layers preferably contain triethyleneglycol-di-2-ethylhexanoate, triethyleneglycol-di-2-ethylbutyrate, or triethyleneglycol-di-n-heptanoate, and more preferably contains triethyleneglycol-di-2-ethylhexanoate.

Preferably, the resin layers each contain an adhesion control agent. In particular, a resin layer that contacts glass in manufacturing laminated glass preferably contains an adhesion control agent.

Suitable examples of the adhesion control agent include alkali metal salts and alkali earth metal salts. Specific examples of the adhesion control agent include salts of potassium, sodium, and magnesium.

Examples of the acid forming the salts include carboxylic organic acids such as octyl acid, hexyl acid, 2-ethylbutyric acid, butyric acid, acetic acid, and formic acid and inorganic acids such as hydrochloric acid and nitric acid. It is preferred that the resin layer that contacts glass contains a magnesium salt or a potassium salt because these salts facilitate control of adhesion between glass and the resin layer in manufacturing laminated glass.

The resin layers may each contain additives such as an antioxidant, a light stabilizer, a modified silicone oil as the adhesion control agent, a flame retardant, an antistatic agent, a moisture-proof agent, a heat reflecting agent, and a heat absorbing agent, depending on the need.

The interlayer film for a laminated glass of the present invention at least includes a first resin layer and a second resin layer as the two or more resin layers.

Preferably, polyvinyl acetal in the first resin layer (hereinafter, referred to as "Polyvinyl acetal A") and polyvinyl acetal in the second resin layer (hereinafter, referred to as "Polyvinyl acetal B") have different amounts of hydroxy groups.

The difference in characteristics between Polyvinyl acetal A and Polyvinyl acetal B allows the interlayer film for a laminated glass to have various properties that are difficult to achieve with a single layer. For example, if the first resin layer is interposed between two layers of the second resin layers, and if Polyvinyl acetal A contains a smaller amount of hydroxy groups than Polyvinyl acetal B, the first resin layer tends to have a lower glass transition temperature than the second resin layers. This allows the first resin layer to be softer than the second resin layers, thus allowing the interlayer film for a laminated glass to have high sound insulating properties. In contrast, if the first resin layer is interposed between two layers of the second resin layers, and if Polyvinyl acetal A contains a larger amount of hydroxy groups than Polyvinyl acetal B, the first resin layer tends to have a higher glass transition temperature than the second resin layers. This allows the first resin layer to be harder than the second resin layers, thus allowing the interlayer film for a laminated glass to have high penetration resistance.

If the first resin layer and the second resin layer each further contain a plasticizer, the amount of the plasticizer in the first resin layer (hereinafter, referred to as "Amount A") based on 100 parts by mass of polyvinyl acetal is preferably different from the amount of the plasticizer in the second resin layer (hereinafter, referred to as "Amount B") based on 100 parts by mass of polyvinyl acetal. For example, if the first resin layer is interposed between two layers of the second resin layers, and if Amount A is larger than Amount B, the first resin layer tends to have a lower glass transition temperature than the second resin layers. This allows the first resin layer to be softer than the second resin layers, thus allowing the interlayer film for a laminated glass to have high sound insulating properties. In contrast, if the first resin layer is interposed between two layers of the second resin layers, and if Amount A is smaller than Amount B, the first resin layer tends to have a higher glass transition temperature than the second resin layers. This allows the first resin layer to be harder than the second resin layers, thus allowing the interlayer film for a laminated glass to have high penetration resistance.

The two or more resin layers constituting the interlayer film for a laminated glass of the present invention may include, for example, a combination of a sound insulating layer as the first resin layer and a protective layer as the second resin layer, for improving sound insulating properties of a laminated glass. From the viewpoint of improving sound insulating properties of a laminated glass, it is preferred that the sound insulating layer contains Polyvinyl acetal X and a plasticizer and that the protective layer contains Polyvinyl acetal Y and a plasticizer. Interposing the sound insulating layer between two layers of the protective layers results in an interlayer film for a laminated glass (hereinafter, also referred to as a "sound insulating interlayer film") having excellent sound insulating properties. The present invention can provide an interlayer film for a laminated glass which can prevent ghosting while containing a laminate of resin layers of different characteristics, such as the sound insulating layer and the protective layer. The sound insulating interlayer film is described in more detail below.

In the sound insulating interlayer film, the sound insulating layer imparts sound insulating properties.

The sound insulating layer preferably contains Polyvinyl acetal X and a plasticizer.

Polyvinyl acetal X may be prepared by acetalizing polyvinyl alcohol with an aldehyde. The polyvinyl alcohol may be typically prepared by saponifying polyvinyl acetate.

The lower limit of the polymerization degree of the polyvinyl alcohol is preferably 200, and the upper limit thereof is preferably 5000. If the polymerization degree of the polyvinyl alcohol is 200 or greater, the resulting sound insulating interlayer film can have improved penetration resistance. If the polymerization degree is 5000 or smaller, moldability of the sound insulating layer is secured. The lower limit of the polymerization degree of the polyvinyl alcohol is more preferably 500, and the upper limit thereof is more preferably 4000.

The lower limit of the carbon number of the aldehyde to be used in acetalization of the polyvinyl alcohol is preferably 4, and the upper limit thereof is preferably 6. If the aldehyde has a carbon number of 4 or greater, the sound insulating layer can stably contain sufficient amount of plasticizer, leading to excellent sound insulating properties. In addition, bleed-out of the plasticizer can be prevented. If the aldehyde has a carbon number of 6 or smaller, Polyvinyl acetal X can be easily synthesized, ensuring productivity.

The aldehyde having a carbon number of 4 to 6 may be a straight-chain aldehyde or a branched aldehyde. Examples thereof include n-butylaldehyde and n-valeraldehyde.

The upper limit of the amount of hydroxy groups in Polyvinyl acetal X is preferably 30 mol %. If the amount of hydroxy groups in Polyvinyl acetal X is 30 mol % or less, the sound insulating layer can contain the plasticizer in an amount required to give sound insulating properties. In addition, bleed-out of the plasticizer can be prevented. The upper limit of the amount of hydroxy groups in Polyvinyl acetal X is more preferably 28 mol %, still more preferably 26 mol %, and particularly preferably 24 mol %. The lower limit thereof is preferably 10 mol %, more preferably 15 mol %, and still more preferably 20 mol %.

The amount of hydroxy groups in Polyvinyl acetal X herein means a mol fraction expressed in percentage (mol %), determined by dividing the amount of ethylene groups to which a hydroxy group is bonded by the amount of all the ethylene groups in the main chain. The amount of ethylene groups to which a hydroxy group is bonded may be determined by, for example, determining the amount of ethylene groups to which a hydroxy group is bonded in Polyvinyl acetal X in accordance with JIS K6728 "Testing methods for polyvinyl butyral."

The lower limit of the amount of acetal groups in Polyvinyl acetal X is preferably 60 mol %, and the upper limit thereof is preferably 85 mol %. If the amount of acetal groups in Polyvinyl acetal X is 60 mol % or more, the sound insulating layer can have significantly improved hydrophobic properties and contain the plasticizer in an amount required to give sound insulating properties. In addition, bleed-out of the plasticizer and whitening of a laminated glass can be prevented. If the amount of acetal groups in Polyvinyl acetal X is 85 mol % or less, Polyvinyl acetal X can be easily synthesized, ensuring productivity. The amount of acetal groups may be determined by determining the amount of ethylene groups to which an acetal group is bonded in Polyvinyl acetal X in accordance with JIS K6728 "Testing methods for polyvinyl butyral."

The lower limit of the amount of acetyl groups in Polyvinyl acetal X is preferably 0.1 mol %, and the upper limit thereof is preferably 30 mol %. If the amount of acetyl groups in Polyvinyl acetal X is 0.1 mol % or more, the sound insulating layer can contain the plasticizer in an amount required to give sound insulating properties. In addition, bleed-out can be prevented. If the amount of acetyl groups in Polyvinyl acetal X is 30 mol % or less, the sound insulating layer can have high hydrophobic properties, thus preventing whitening of a laminated glass. The lower limit of the amount of acetyl groups is more preferably 1 mol %, still more preferably 5 mol %, particularly preferably 6 mol %, and most preferably 8 mol %. The upper limit thereof is more preferably 25 mol % and still more preferably 20 mol %. The amount of acetyl groups herein means the mole fraction expressed in percentage (mol %), determined by subtracting the amount of ethylene groups to which an acetal group is bonded and the amount of ethylene groups to which a hydroxy group is bonded from the amount of all the ethylene groups in the main chain and dividing the resultant difference by the amount of all the ethylene groups in the main chain.

It is particularly preferred that Polyvinyl acetal X is polyvinyl acetal that contains 8 mol % or more of acetyl groups or polyvinyl acetal that contains less than 8 mol % of acetyl groups and 68 mol % or more of acetal groups because such polyvinyl acetal facilitates incorporation of the plasticizer in an amount required to give sound insulating properties into the sound insulating layer.

The lower limit of the amount of the plasticizer in the sound insulating layer is preferably 45 parts by mass based on 100 parts by mass of Polyvinyl acetal X, and the upper limit thereof is preferably 80 parts by mass. If the amount of the plasticizer is 45 parts by mass or more, the sound insulating layer can exhibit high sound insulating properties. If the amount of the plasticizer is 80 parts by mass or less, bleed-out of the plasticizer, which reduces transparency or adhesion of the interlayer film for a laminated glass, can be prevented. The lower limit of the amount of the plasticizer in the sound insulating layer is more preferably 50 parts by mass, still more preferably 55 parts by mass. The upper limit thereof is more preferably 75 parts by mass and still more preferably 70 parts by mass.

The lower limit of the thickness of the sound insulating layer is preferably 0.05 mm. If the thickness of the sound insulating layer is 0.05 mm or greater, the layer can exhibit sufficient sound insulating properties. The lower limit of the thickness of the sound insulating layer is more preferably 0.08 mm. The upper limit thereof is not particularly limited, but preferably 0.3 mm in view of the thickness of the interlayer film for a laminated glass.

The protective layer prevents a large amount of plasticizer in the sound insulating layer from bleeding out and thus prevents lowering of adhesion between the interlayer film for a laminated glass and the glass. The protective layer also imparts penetration resistance to the interlayer film for a laminated glass.

The protective layer preferably contains, for example, Polyvinyl acetal Y and a plasticizer, and more preferably contains Polyvinyl acetal Y which contains a larger amount of hydroxy groups than Polyvinyl acetal X and a plasticizer.

Polyvinyl acetal Y can be obtained by acetalizing polyvinyl alcohol with an aldehyde.

The polyvinyl alcohol may be typically prepared by saponifying polyvinyl acetate.

The lower limit of the polymerization degree of the polyvinyl alcohol is preferably 200, and the upper limit thereof is preferably 5000. If the polymerization degree of the polyvinyl alcohol is 200 or greater, the interlayer film for a laminated glass can have improved penetration resistance. If the polymerization degree is 5000 or smaller, moldability of the protective layer is ensured. The lower limit of the polymerization degree of the polyvinyl alcohol is more preferably 500, and the upper limit thereof is more preferably 4000.

The lower limit of the carbon number of the aldehyde to be used in acetalization of the polyvinyl alcohol is preferably 3, and the upper limit thereof is preferably 4. If the aldehyde has a carbon number of 3 or greater, the interlayer film for a laminated glass has improved penetration resistance. If the aldehyde has a carbon number of 4 or smaller, the productivity of Polyvinyl acetal Y is improved.

The aldehyde having a carbon number of 3 to 4 may be a straight-chain aldehyde or a branched aldehyde. Examples thereof include n-butylaldehyde.

The upper limit of the amount of hydroxy groups in Polyvinyl acetal Y is preferably 33 mol %, and the lower limit thereof is preferably 28 mol %. If the amount of hydroxy groups in Polyvinyl acetal Y is 33 mol % or less, whitening of the interlayer film for a laminated glass can be prevented. If the amount of hydroxy groups in Polyvinyl acetal Y is 28 mol % or more, the interlayer film for a laminated glass has high penetration resistance.

The lower limit of the amount of acetal groups in Polyvinyl acetal Y is preferably 60 mol %, and the upper limit thereof is preferably 80 mol %. If the amount of acetal groups is 60 mol % or more, the protective layer can contain the plasticizer in an amount required to give sufficient penetration resistance. If the amount of acetal groups is 80 mol % or smaller, adhesion between the protective layer and glass can be secured. The lower limit of the amount of acetal groups is more preferably 65 mol %, and the upper limit thereof is more preferably 69 mol %.

The upper limit of the amount of acetyl groups in Polyvinyl acetal Y is preferably 7 mol %. If the amount of acetyl groups in Polyvinyl acetal Y is 7 mol % or smaller, the protective layer can have high hydrophobic properties, thus preventing whitening. The upper limit of the amount of acetyl groups is more preferably 2 mol %, and the lower limit thereof is preferably 0.1 mol %. The amount of hydroxy groups, the amount of acetal groups, and the amount of acetyl groups in Polyvinyl acetals A, B, and Y may be determined in the same manner as those of Polyvinyl acetal X.

The lower limit of the amount of the plasticizer in the protective layer is preferably 20 parts by mass based on 100 parts by mass of Polyvinyl acetal Y, and the upper limit thereof is preferably 45 parts by mass. If the amount of the plasticizer in the protective layer is 20 parts by mass or more, penetration resistance of the protective layer is secured. If the amount of the plasticizer in the protective layer is 45 parts by mass or less, bleed-out of the plasticizer, which reduces transparency or adhesion of the interlayer film for a laminated glass, can be prevented. The lower limit of the amount of the plasticizer in the protective layer is more preferably 30 parts by mass, and still more preferably 35 parts by mass. The upper limit thereof is more preferably 43 parts by mass and still more preferably 41 parts by mass.

For further improvement in sound insulating properties of a laminated glass, Polyvinyl acetal Y preferably contains a larger amount of hydroxy groups than Polyvinyl acetal X. Polyvnyl acetal Y more preferably contains at least 1 mol % more hydroxy groups, still more preferably at least 5 mol % more hydroxy groups, and particularly preferably at least 8 mol % more hydroxy groups than Polyvinyl acetal X. Control of the amount of hydroxy groups in Polyvinyl acetal X and in Polyvinyl acetal Y allows control of the amount of the plasticizer in the sound insulating layer and in the protective layer, thus allowing the sound insulating layer to have a low glass transition temperature. This further improves sound insulating properties of a laminated glass.

For further improvement in sound insulating properties of a laminated glass, the amount of the plasticizer in the sound insulating layer (hereinafter, also referred to as "Amount X") based on 100 parts by mass of Polyvinyl acetal X is preferably larger than the amount of the plasticizer in the protective layer (hereinafter, also referred to as "Amount Y") based on 100 parts by mass of Polyvinyl acetal Y. The Amount X is preferably larger by at least 5 parts by mass, more preferably by at least 15 parts by mass, and particularly preferably by at least 20 parts by mass, than Amount Y. Control of Amount X and Amount Y allows the sound insulating layer to have a low glass transition temperature. This further improves sound insulating properties of a laminated glass.

The lower limit of the thickness of the protective layer is preferably 0.2 mm, and the upper limit thereof is preferably 3 mm. If the protective layer has a thickness of 0.2 mm or greater, the layer can provide sufficient penetration resistance.

The lower limit of the thickness of the protective layer is more preferably 0.3 mm. The upper limit thereof is more preferably 1.5 mm, still more preferably 0.5 mm, and particularly preferably 0.4 mm.

The way of producing the sound insulating interlayer film is not particularly limited. For example, the sound insulating interlayer film may be produced by forming sheets of the sound insulating layer and the protective layer by a common film production method, such as an extrusion method, a calender method, or a press method, and laminating the sheets together.

The present invention also provides a laminated glass comprising the interlayer film for a laminated glass of the present invention. The glass plate to be used in the laminated glass of the present invention is not particularly limited, and may be any commonly used transparent plate glass. Examples thereof include inorganic glass such as float plate glass, polished plate glass, figured plate glass, wire mesh glass, wire-lined glass, colored plate glass, and heat ray-absorbing glass.

The way of producing the laminated glass of the present invention is not particularly limited. A conventionally known production method may be employed.

Advantageous Effects of Invention

The present invention provides an interlayer film for a laminated glass including two or more resin layers laminated together. The interlayer film has excellent deaeration properties in the manufacturing process of a laminated glass and prevents ghosting. The present invention also provides a laminated glass including the interlayer film for a laminated glass.

DESCRIPTION OF EMBODIMENTS

Figure 1:
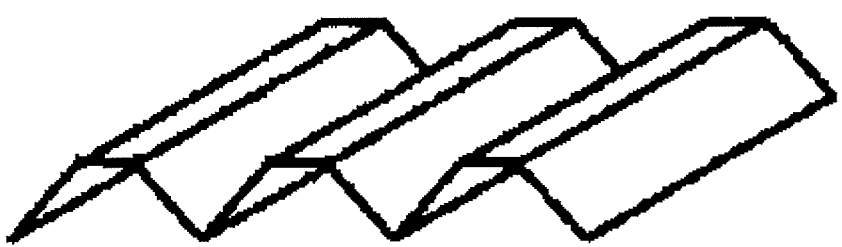
FIG. 1 is a schematic view illustrating an example of an interlayer film for a laminated glass on the surface of which recesses each having a groove shape with a continuous bottom are formed at equal intervals, and recesses adjacent to each other are parallel.
Figure 2:
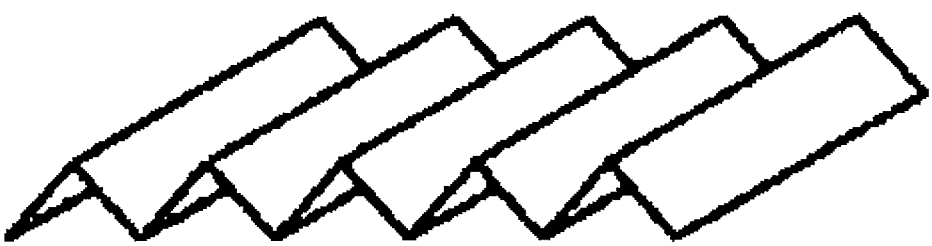
FIG. 2 is a schematic view illustrating an example of an interlayer film for a laminated glass on the surface of which recesses each having a groove shape with a continuous bottom are formed at equal intervals, and recesses adjacent to each other are parallel.

The embodiments of the present invention are described in detail below based on, but not limited to, examples.

Example 1

(1) Preparation of Resin Composition for First Resin Layer (Sound Insulating Layer)

Polyvinyl alcohol having an average polymerization degree of 2400 was acetalized with n-butylaldehyde to prepare polyvinyl butyral (acetyl group content: 12 mol %, butyral content: 66 mol %, hydroxy group content: 22 mol %). The polyvinyl butyral (100 parts by mass) was mixed with triethyleneglycol-di-2-ethylhexanoate (3GO) (60 parts by mass) as a plasticizer, and the mixture was sufficiently kneaded with a mixing roll. A resin composition for a first resin layer (sound insulating layer) was thus obtained.

(2) Preparation of Resin Composition for Second Resin Layer (Protective Layer)

Polyvinyl alcohol having an average polymerization degree of 1700 was acetalized with n-butylaldehyde to prepare polyvinyl butyral (acetyl group content: 1 mol %, butyral content: 69 mol %, hydroxy group content: 30 mol %). The polyvinyl butyral (100 parts by mass) was mixed with triethyleneglycol-di-2-ethylhexanoate (3GO) (40 parts by mass) as a plasticizer, and the mixture was sufficiently kneaded with a mixing roll. A resin composition for a second resin layer (protective layer) was thus obtained.

(3) Preparation of Interlayer Film for a Laminated Glass

The resin composition for forming a first resin layer (sound insulating layer) and the resin composition for forming second resin layers (protective layers) were co-extruded with a co-extruder, whereby an interlayer film (thickness: 0.8 mm) for a laminated glass in which the first resin layer (sound insulating layer) was interposed between the two second resin layers (protective layers) was obtained. The first resin layer had a thickness of 0.1 mm. The second resin layers each had a thickness of 0.35 mm.

(4) Formation of Recesses and Protrusions

A pair of rolls including a metal roll having a surface milled with a triangular oblique line-type mill (available from YURIROLL Co., Ltd.) and a rubber roll having a JIS hardness of 45 to 75 was used as a device for transferring the pattern of recesses and protrusions. The obtained interlayer film for a laminated glass was passed through these rolls, whereby recesses and protrusions were formed on one surface (a first surface) of the interlayer film. The recesses each had a groove shape with a continuous bottom and formed parallel to one another at equal intervals. The transfer was carried out under the conditions that the temperature of the interlayer film for a laminated glass was room temperature, the roll temperature was 130° C., the linear velocity was 10 m/min, and the press linear pressure was 500 kPa.

Subsequently, the other surface (a second surface) of the interlayer film for a laminated glass was subjected to the same operation, whereby recesses each having a groove shape with a continuous bottom were formed on the surface.

As for the recesses and protrusions formed on the first surface, the interval between a recess having a groove shape with a continuous bottom and an adjacent one was 200 µm, and the recesses had a groove depth (Rzg) of 22 µm. As for the recesses and protrusions formed on the second surface, the interval between a recess having a groove shape with a continuous bottom and an adjacent one was 200 µm, and the recesses had a groove depth (Rzg) of 18 µm.

The recess interval above was determined as follows. The first and second surfaces (viewing range: 20 mm×20 mm) of the interlayer film for a laminated glass were each observed with a light microscope ("BS-8000III" available from SONIC-GROUP), and the interval between each pair of recesses adjacent to each other was determined. On the basis of the obtained values, the average of the shortest distances between the bottommost portions of recesses adjacent to each other was calculated, whereby the recess interval was determined. The average of the shortest distances and the largest thereof were the same.

The groove depth (Rzg) of the recesses herein is the average value of the groove depth determined using the groove depth of observed recesses and the number of the observed recesses. The groove depths of the observed recesses are each calculated based on the average line (a line that is set such that the sum of the squares of the deviations from that line to the roughness curve be minimized) of a roughness curve in accordance with JIS B-0601 (1994) "Surface roughness—Definitions and designation." The groove depth (Rzg) of the recesses was determined by processing digital signals obtained using a surface roughness tester ("SE1700α" available from Kosaka Laboratory Ltd.).

Examples 2 to 7, Comparative Example 1

Interlayer films for a laminated glass having recesses and protrusions on the surfaces was obtained in the same manner as in Example 1 except that the interval between a recess having a groove shape with a continuous bottom and an adjacent one and the groove depth (Rzg) of the recesses were as listed in Table 1.

The average of the shortest distances and the maximum of the shortest distances, which were determined in the measurement of the recess interval, were the same as each other in each of Examples 2 to 7 and Comparative Example 1.

Example 8

An interlayer film for a laminated glass was obtained in the same manner as in Example 1 except that the amount of triethyleneglycol-di-2-ethylhexanoate (3GO) added in preparation of the resin composition for the first resin layer (sound insulating layer) was 70 parts by mass.

Example 9

An interlayer film for a laminated glass was obtained in the same manner as in Example 2 except that the amount of triethyleneglycol-di-2-ethylhexanoate (3GO) added in preparation of the resin composition for a first resin layer (sound insulating layer) was 70 parts by mass.

Example 10

An interlayer film for a laminated glass was obtained in the same manner as in Example 7 except that the amount of triethyleneglycol-di-2-ethylhexanoate (3GO) added in preparation of the resin composition for the first resin layer (sound insulating layer) was 70 parts by mass.

Example 11

An interlayer film for a laminated glass was obtained in the same manner as in Example 1 except that the polyvinyl butyral used in preparation of the resin composition for the first resin layer (sound insulating layer) was polyvinyl butyral (acetyl group content: 6 mol %, butyral group content: 72 mol %, hydroxy group content: 22 mol %) obtained by acetalizing polyvinyl alcohol having an average polymerization degree of 2400 with n-butylaldehyde.

Example 12

An interlayer film for a laminated glass was obtained in the same manner as in Example 1 except that the polyvinyl butyral used in preparation of the resin composition for the first resin layer (sound insulating layer) was polyvinyl butyral (acetyl group content: 24 mol %, butyral group content: 56 mol %, hydroxy group content: 20 mol %) obtained by acetalizing polyvinyl alcohol having an average polymerization degree of 2400 with n-butylaldehyde.

Example 13

An interlayer film for a laminated glass was obtained in the same manner as in Example 5 except that the polyvinyl butyral used in preparation of the resin composition for the first resin layer (sound insulating layer) was polyvinyl butyral (acetyl group content: 1 mol %, butyral group content: 79 mol %, hydroxy group content: 20 mol %) obtained by acetalizing polyvinyl alcohol having an average polymerization degree of 2400 with n-butylaldehyde.

(Evaluation)

The interlayer films for a laminated glass having recesses and protrusions on the surfaces obtained in the examples and the comparative example were evaluated by the following methods.

The results are shown in Tables 1 and 2.

(1) Evaluation of Deaeration Properties

A laminated glass was produced using the obtained interlayer film for a laminated glass having recesses and protrusions on the surfaces. Specifically, preliminary pressure bonding by a vacuum deaeration method and full pressure bonding were performed as follows.

(Vacuum Deaeration Method)

The interlayer film was interposed between two clear glass plates (length 30 cm×width 30 cm×thickness 2.5 mm). The portions of the film protruding from the plates were cut off. A laminated glass structure (laminate) was thus produced. This structure was transported into a rubber bag, which was then connected to a vacuum suction device. The rubber bag was held under a reduced pressure of −60 kPa (absolute pressure 16 kPa) for 10 minutes with heating so that the temperature (preliminary pressure bonding temperature) of the laminated glass structure (laminate) reached 70° C. Thereafter, the pressure was returned to atmospheric pressure, whereby the preliminary pressure bonding was completed. Here, the deaeration starting temperature in the preliminary pressure bonding was 40° C., 50° C., or 60° C.

(Full Pressure Bonding)

The laminated glass structure (laminate) preliminarily pressure bonded in the above manner was put in an autoclave and held at a temperature of 140° C. at a pressure of 1300 kPa for 10 minutes. Thereafter, the temperature was decreased to 50° C. and the pressure was returned to atmospheric pressure, whereby the full pressure bonding was completed. A laminated glass was thus produced.

(Baking Test of Laminated Glass)

The obtained laminated glass was heated in an oven at 140° C. for 2 hours. Thereafter, the laminated glass was taken out of the oven and allowed to cool for 3 hours. The appearance of the cooled laminated glass was visually observed. Twenty sheets of the laminated glass were tested, and the number of sheets in which foam (air bubbles) were formed was determined. The deaeration properties were evaluated based on the number.

(2) Evaluation of Ghosting

The laminated glass was evaluated for the presence of ghosting using two light sources having different intensities, a light source 1 and a light source 2. The light source 1 was a 10 W silica bulb (available from Kyokko Electric Co., Ltd., PS55 E26 110V-10W, total flux: 70 lm) to simulate a light source of a typical intensity which can be incident on window glass of automobiles, aircraft, architectures, or the like. The light source 2 was a 40 W silica bulb (available from ASAHI ELECTRIC Co., Ltd., LW100V38W-W, total flux: 440 lm) to simulate a light source which particularly had a high intensity among lights which can be incident on window glass of automobiles, aircraft, architectures or the like.

The evaluation was carried out in accordance with JIS R 3212 (2008). A laminated glass was evaluated as "excellent (oo)" if it gave, whether using the light source 1 or the light source 2, a single image or a double image with a separation of within 15 minutes of arc. It was evaluated as "good (O)" if it gave ghost images using the light source 2 but gave a single image or a double image with a separation of within 15 minutes of arc using the light source 1. It was evaluated as "poor (x)" if it gave ghost images whether using the light source 1 or the light source 2.

The mounting angle to the actual vehicle was 30°. The double image with a separation of within 15 minutes of arc was due to the glass, not the interlayer film.

TABLE 1

| | | Example 1 | Example 2 | Example 3 | Example 4 | Example 5 | Example 6 | Example 7 | Comparative Example 1 |
|---|---|---|---|---|---|---|---|---|---|
| Recess interval (μm) | First surface | 200 | 180 | 500 | 600 | 200 | 180 | 400 | 750 |
| | Second surface | 200 | 180 | 500 | 600 | 200 | 180 | 400 | 750 |
| Groove depth of recesses (Rzg) (μm) | First surface | 22 | 22 | 21 | 20 | 28 | 27 | 20 | 25 |
| | Second surface | 18 | 17 | 20 | 21 | 26 | 22 | 20 | 24 |

TABLE 1-continued

|  |  | Example 1 | | | Example 2 | | | Example 3 | | | Example 4 | | | Example 5 | | | Example 6 | | | Example 7 | | | Comparative Example 1 | | |
|---|---|---|---|---|---|---|---|---|---|---|---|---|---|---|---|---|---|---|---|---|---|---|---|---|---|
| Evaluation of deaeration properties | Deaeration starting temperature/° C. | 40 | 50 | 60 | 40 | 50 | 60 | 40 | 50 | 60 | 40 | 50 | 60 | 40 | 50 | 60 | 40 | 50 | 60 | 40 | 50 | 60 | 40 | 50 | 60 |
|  | Preliminary pressure bonding temperature/° C. | 70 | 70 | 70 | 70 | 70 | 70 | 70 | 70 | 70 | 70 | 70 | 70 | 70 | 70 | 70 | 70 | 70 | 70 | 70 | 70 | 70 | 70 | 70 | 70 |
|  | Baking test (Number of sheets in which foaming occured/20 sheets) | 0 | 1 | 1 | 0 | 1 | 1 | 0 | 0 | 0 | 0 | 0 | 0 | 0 | 1 | 2 | 0 | 2 | 2 | 0 | 0 | 1 | 0 | 0 | 0 |
| Evaluation of ghosting |  | ◯◯ | | | ◯◯ | | | ◯ | | | ◯ | | | ◯◯ | | | ◯◯ | | | ◯◯ | | | X | | |

TABLE 2

|  |  | Example 8 | | | Example 9 | | | Example 10 | | | Example 11 | | | Example 12 | | | Example 13 | | |
|---|---|---|---|---|---|---|---|---|---|---|---|---|---|---|---|---|---|---|---|
| Recess interval (μm) | First surface | 200 | | | 180 | | | 400 | | | 200 | | | 200 | | | 200 | | |
|  | Second surface | 200 | | | 180 | | | 400 | | | 200 | | | 200 | | | 200 | | |
| Groove depth of recesses (Rzg) (μm) | First surface | 22 | | | 22 | | | 20 | | | 22 | | | 22 | | | 28 | | |
|  | Second surface | 18 | | | 17 | | | 20 | | | 18 | | | 18 | | | 26 | | |
| Evaluation of deaeration properties | Deaeration starting temperature/° C. | 40 | 50 | 60 | 40 | 50 | 60 | 40 | 50 | 60 | 40 | 50 | 60 | 40 | 50 | 60 | 40 | 50 | 60 |
|  | Preliminary pressure bonding temperature/° C. | 70 | 70 | 70 | 70 | 70 | 70 | 70 | 70 | 70 | 70 | 70 | 70 | 70 | 70 | 70 | 70 | 70 | 70 |
|  | Baking test (Number of sheets in which foaming occured/20 sheets) | 0 | 1 | 2 | 1 | 1 | 1 | 0 | 1 | 1 | 0 | 1 | 1 | 0 | 1 | 2 | 0 | 1 | 1 |
| Evaluation of ghosting |  | ◯◯ | | | ◯◯ | | | ◯◯ | | | ◯◯ | | | ◯◯ | | | ◯◯ | | |

INDUSTRIAL APPLICABILITY

The present invention provides an interlayer film for a laminated glass including two or more resin layers laminated together. The interlayer film has excellent deaeration properties in the manufacturing process of a laminated glass and prevents ghosting. The present invention also provides a laminated glass comprising the interlayer film for a laminated glass.

The invention claimed is:

1. An interlayer film for a laminated glass, the interlayer film comprising:
a sound insulating layer comprising a polyvinyl acetal X and a plasticizer interposed between two layers of a protective layer comprising a polyvinyl acetal Y and a plasticizer,
wherein:
the polyvinyl acetal Y comprises a larger amount of hydroxy groups than the polyvinyl acetal X,
an amount of the plasticizer in the sound insulating layer based on 100 parts by mass of the polyvinyl acetal X is larger than an amount of the plasticizer in the protective layer based on 100 parts by mass of the polyvinyl acetal Y,
the interlayer film having minute recesses and minute protrusions on at least one surface thereof,
the recesses each having a groove shape with a continuous bottom,
the recesses being formed in a regular manner,
recesses adjacent to each other being parallel,
recesses adjacent to each other being spaced 100 to 400 μm apart, and
the recesses have a groove depth (Rzg) determined in accordance with JIS B-0601 (1994) of 10 to 28 μm,
wherein a laminated glass comprising the interlayer film interposed between two clear glass plates having 2.5 mm thickness gives a single image or a double image with a separation of within 15 minutes of arc when evaluating ghosting in accordance with JIS R 3212 (2008) with a 10 W silica bulb light source or a 40 W silica bulb light source.

2. The interlayer film according to claim 1,
wherein the recesses are formed at equal intervals, and recesses adjacent to each other are parallel.

3. The interlayer film according to claim 1,
wherein the polyvinyl acetal Y comprises 28 to 33 mol % of hydroxy groups, 60 to 80 mol % of acetal groups and 7 mol % or less of acetyl groups.

4. The interlayer film according to claim 1,
wherein the sound insulating layer comprises 45 to 80 parts by mass of the plasticizer based on 100 parts by mass of the polyvinyl acetal X.

5. The interlayer film according to claim 1,
wherein the protective layer comprises 20 to 40 parts by mass of the plasticizer based on 100 parts by mass of the polyvinyl acetal Y.

6. The interlayer film according to claim 1,
wherein the polyvinyl acetal Y comprises at least 1 mol % more of hydroxy groups than the polyvinyl acetal X.

7. The interlayer film according to claim 1,
wherein the amount of the plasticizer in the sound insulating layer based on 100 parts by mass of the polyvinyl acetal X is larger by at least 5 parts by mass than the amount of the plasticizer in the protective layer based on 100 parts by mass of the polyvinyl acetal Y.

* * * * *